US012719887B1

(12) United States Patent
Alleyne et al.

(10) Patent No.: US 12,719,887 B1
(45) Date of Patent: Aug. 25, 2026

(54) USING MACHINE LEARNING TO REDUCE ALERT FATIGUE

(71) Applicant: CDW LLC, Vernon Hills, IL (US)

(72) Inventors: Nikeitha Alleyne, Mississauga (CA); Vinamra Bhatnagar, Brampton (CA)

(73) Assignee: CDW LLC, Vernon Hills, IL (US)

( * ) Notice: Subject to any disclaimer, the term of this patent is extended or adjusted under 35 U.S.C. 154(b) by 78 days.

(21) Appl. No.: 18/593,783

(22) Filed: Mar. 1, 2024

Related U.S. Application Data

(60) Provisional application No. 63/488,447, filed on Mar. 3, 2023.

(51) Int. Cl.
*H04L 9/40* (2022.01)
*G06N 20/20* (2019.01)

(52) U.S. Cl.
CPC ......... *H04L 63/1416* (2013.01); *G06N 20/20* (2019.01); *H04L 63/1433* (2013.01)

(58) Field of Classification Search
CPC .. H04L 63/1416; H04L 63/1433; G06N 20/20
See application file for complete search history.

(56) References Cited

U.S. PATENT DOCUMENTS 12,118,095 B1 * 10/2024 Millar .................... G06N 20/00
2021/0168165 A1 * 6/2021 Alsaeed ................. G06N 20/00
2021/0281592 A1 * 9/2021 Givental ............... G06N 20/10

* cited by examiner

*Primary Examiner* — Beemnet W Dada
(74) *Attorney, Agent, or Firm* — MARSHALL, GERSTEIN & BORUN LLP

(57) ABSTRACT

A method for improved security threat analysis includes receiving electronic security data; generating a security threat diagnosis; and displaying the security threat diagnosis. A system for improved security threat analysis includes a user interface; one or more processors; and a non-transitory, computer-readable memory coupled to the one or more processors and the user interface, the memory having stored thereon instructions that, when executed by the one or more processors, cause the one or more processors to receive electronic security data; generate a security threat diagnosis; and display the security threat diagnosis. A tangible machine-readable medium includes instructions, when executed, cause a machine to receive electronic security data; generate a security threat diagnosis; and display the security threat diagnosis.

19 Claims, 17 Drawing Sheets

```
# Gain access to the data and perform an initial read
pd.read._csv(r'D:\ML\SecuroityIncidents.csv', header=0, sep=',', encoding_errors='ignore').head(5)
```

| | Description | Details | Status |
|---|---|---|---|
| 0 | SEVERITY-3: DE000: AWS Cloud: Password Policy ... | AlertID: 44459\nAlert start time: 2021-04-15 0... | True Positive - Benign |
| 1 | SEVERITY-3: E0000: Detected Excessive Executio... | AlertID: 41400\nAlert start time: 2021-03-28 1... | True Positive - Benign |
| 2 | SEVERITY-3: CC000: Excessive Outbound Connecti... | AlertID: 43646\nAlert start time: SEVERITY-3... | True Positive - Benign |
| 3 | SEVERITY-3: High Number of Blocked Events from... | AlertID: 34089\nAlert start time: 2020-11-02 1... | False Positive |
| 4 | SEVERITY-3: IA006: Multiple Login Failures for... | AlertID: 37923\nAlert start time: 2021-03-05 0... | True Positive - Benign |

FIG. 2A

```
# Look at the first record description
df_security_incidents.Details[0]
```

```
"AlertID" 44459\nAlert start tiem: 2021-04-15 07:01:26\nAlert Description:SEVERITY-3: DE000: AWS Cloud: Password Policy Updated - securitynik\nAlert Cr
iticality: Medium\nMultiple Category: ['Suspicious Activity', 'Policy Change']\nFirst Event Timestamp: 2021-04-15 07:01:26\nLast Event Timestamp:2021-0
4-15 07:02:59\nAlert Type: Alert\nAlert Index: Username\nSource IP: IP is not valid\nDestination IP: IP is not valid\nMagnitude: 2"
```

FIG. 2B

```
['SEVERITY-3CLIENT1106:',
 'Detected',
 'Excessive',
 'Execution',
 'Of',
 'SC',
 'Command',
 '-',
 'Alert',
 'Index:']
```

FIG. 2E

```
# What is this TFIDF?
corpus = ['SANS Rock', 'SANS Rock Paper', 'SANS Rock Paper Scissor']
tfidf_vect = TfidfVectorizer()
Vectorized_corpus = tfidf_vect.fit_transform(corpus)
pd.DataFrame(vectorized_corpus.toarray(), columns=tfidf_vect.get_feature_names())
```

| | paper | rock | sans | scissor |
|---|---|---|---|---|
| **0** | 0.000000 | 0.707107 | 0.707107 | 0.00000 |
| **1** | 0.673255 | 0.522842 | 0.522842 | 0.00000 |
| **2** | 0.504107 | 0.391484 | 0.391484 | 0.66284 |

FIG. 2G

```
# Prepare the pipelines
nb_pipeline = Pipeline([+
                ('tfidf', TfidfVectorizer()),
                ('nb_clf', ComplementNB()),
            ])

lr_pipeline = Pipeline([
                ('tfidf', TfidfVectorizer()),
                ('lr_clf', LogisticRegression()),
            ])

ada_pipeline = Pipeline([
                ('tfidf', TfidfVectorizer()),
                ('ada_clf', AdaBoost()),
            ])
```

```
# Append the pipelines to the model list
models.append(nb_pipeline)
models.append(lr_pipeline)
models.append(ada_pipeline)
```

```
for model in models:
    model.fit(X_train.astype('str'), y_train)
```

FIG. 2H

```
lr_parameters = {
    'tfidf_ngram_range' : [(1,1), (1,2)],
    'tfidf_max_df' : (0.25, 0.5, 0.75),
    'tfidf_max_features' : [300, 500, 1000, None],

    'lr_clf_penalty' : ['11', '12', None],
    'lr_clf_solver' : ['sag', 'liblinear', 'lbfgs'],
    'lr_clf_class_weight' : [{0:1, 1:1}, {0:1, 1:2}, {0:1, 1:3}]
}
```

```
from sklearn.model_selection import RandomizedSearchCV
```

```
# Setup the RandomizedSearchCV
lr_random_cv = RandomizedSearchCV(estimator=lr_pipeline, parame_distributions=lr_parameters, scoring='recall', n_iter=10, cv=5, random_state=
lr_random_cv.fit)x_train.astype('str'), y_train)
```

FIG. 2J

USING MACHINE LEARNING TO REDUCE ALERT FATIGUE

CROSS-REFERENCE TO RELATED APPLICATIONS

The present application claims priority to U.S. Provisional Application No. 63/488,447, entitled USING MACHINE LEARNING TO REDUCE ALERT FATIGUE, filed on Mar. 3, 2023, and hereby incorporated by reference in its entirety.

TECHNICAL FIELD

The present disclosure is generally directed to using machine learning to reduce alert fatigue, and more particularly, to methods and systems for improving security threat analysis by processing electronic security data using ensemble machine learning models to generate security threat assessment diagnoses.

BACKGROUND

Classifying security events is challenging for several reasons. Security teams are inundated with a large volume of security event data every day. Classifying each event manually is time-consuming and error-prone and leads to false positives or false negatives. Further, the security landscape is becoming increasingly complex due to advancements in technology (e.g., cloud computing) and the ever-evolving threat landscape. New types of attacks and threats emerge regularly, making it difficult to keep up with the latest threats and attack techniques. Still further, organizations use a diverse set of systems and tools to monitor and manage security events, and each system may have its own way of categorizing events. This can create confusion and inconsistencies when trying to classify events across different systems. Specifically, the large number of security tools, combined with the large number of alerts (many of which are benign of false positives) leads to analyst alert fatigue.

Furthermore, attackers are becoming increasingly sophisticated in their methods, making it difficult to detect and classify attacks. For example, attackers may use advanced techniques like obfuscation and encryption to evade detection, making it difficult to classify events as malicious. Additionally, a mitigation technique that works for one type of attack may not work for another. Moreover, security events can be difficult to classify without sufficient context. For example, a login attempt from a new device might be suspicious, but it could also be a legitimate login attempt by a user who is traveling and using a new device. Without enough context, it can be difficult to determine whether an event is malicious or benign.

For these reasons and more, there is an opportunity for improved techniques and platforms for classifying security events.

BRIEF SUMMARY

In one aspect, a computer-implemented method for improved security threat analysis includes (i) receiving, at one or more processors, an electronic security data representing a potential security threat to a computing system; (ii) generating, by processing the electronic security data using a machine learning (ML) model, a security threat diagnosis indicating a likelihood that the electronic security data represents a true security threat to the computing system, wherein the ML model comprises a plurality of ML models that are each trained with respective training electronic security data as input to generate a respective plurality of training security threat diagnoses as outputs; and (iii) displaying, by one or more processors, the security threat diagnosis on a user interface for viewing by a user.

In another aspect, a system for improved security threat analysis includes a user interface; one or more processors; and a non-transitory, computer-readable memory coupled to the one or more processors and the user interface, the memory having stored thereon instructions that, when executed by the one or more processors, cause the one or more processors to: (i) receive electronic security data representing a potential security threat to a computing system; (ii) generate, by processing the electronic security data using a machine learning (ML) model, a security threat diagnosis indicating a likelihood that the electronic security data represents a true security threat to the computing system, wherein the ML model comprises a plurality of ML models that are each trained with respective training electronic security data as input to generate a plurality of training security threat diagnoses as outputs; and (iii) display the security threat diagnosis on the user interface for viewing by a user.

In yet another aspect, a tangible machine-readable medium includes instructions for improved security threat analysis that, when executed, cause a machine to at least: (i) receive electronic security data representing a potential security threat to a computing system; (ii) generate, by processing the electronic security data using an machine learning (ML) model, a security threat diagnosis corresponding to a likelihood that the electronic security data represents a true security threat to the computing system, wherein the ML model comprises a plurality of ML models that are each trained with respective training electronic security data as input to generate a respective plurality of training security threat diagnoses as outputs; and (iii) display the security threat diagnosis on a user interface for viewing by a user.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2A depicts example labeled training data that may be used to train one or more machine learning models, according to some aspects.

FIG. 2B depicts security ticket details included in the labeled training data of FIG. 2A, according to some aspects.

FIG. 2E depicts exemplary tokenization of training data samples, according to some aspects.

FIG. 2G depicts example term-frequency inverse document frequency (TFIDF) vectorization, according to some aspects.

FIG. 2H depicts example machine learning model training, according to some aspects.

FIG. 2J depicts an example optimization procedure, according to some aspects.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The present techniques provide methods and systems for, inter alia, improved security threat analysis. For example, the present techniques include aspects of processing electronic security data (e.g., electronic tickets) using machine learning.

The present techniques may utilize machine learning (ML) technologies and/or artificial intelligence (AI) to process security-related data. For example, in some aspects, the present techniques receive electronic security data (e.g., tickets); process the tickets using one or more trained ML model to generate security threat diagnoses; and display the diagnosis to a user, generate a report including the diagnosis, and/or cause an automated action to occur based upon the diagnosis.

The present techniques leverage modern technology to automate mundane tasks associated with manually reviewing voluminous security alert data. By automating security event data analysis using machine learning, large volumes of security data do not need to be stored on disk, freeing up large volumes (e.g., terabytes or more) of storage space. Results are also delivered much faster (e.g., within fractions of a second of a security event occurring, in some instances) which means that time-sensitive security breaches can be discovered and mitigated more quickly.

Exemplary Computing Environment

Figure 1A:
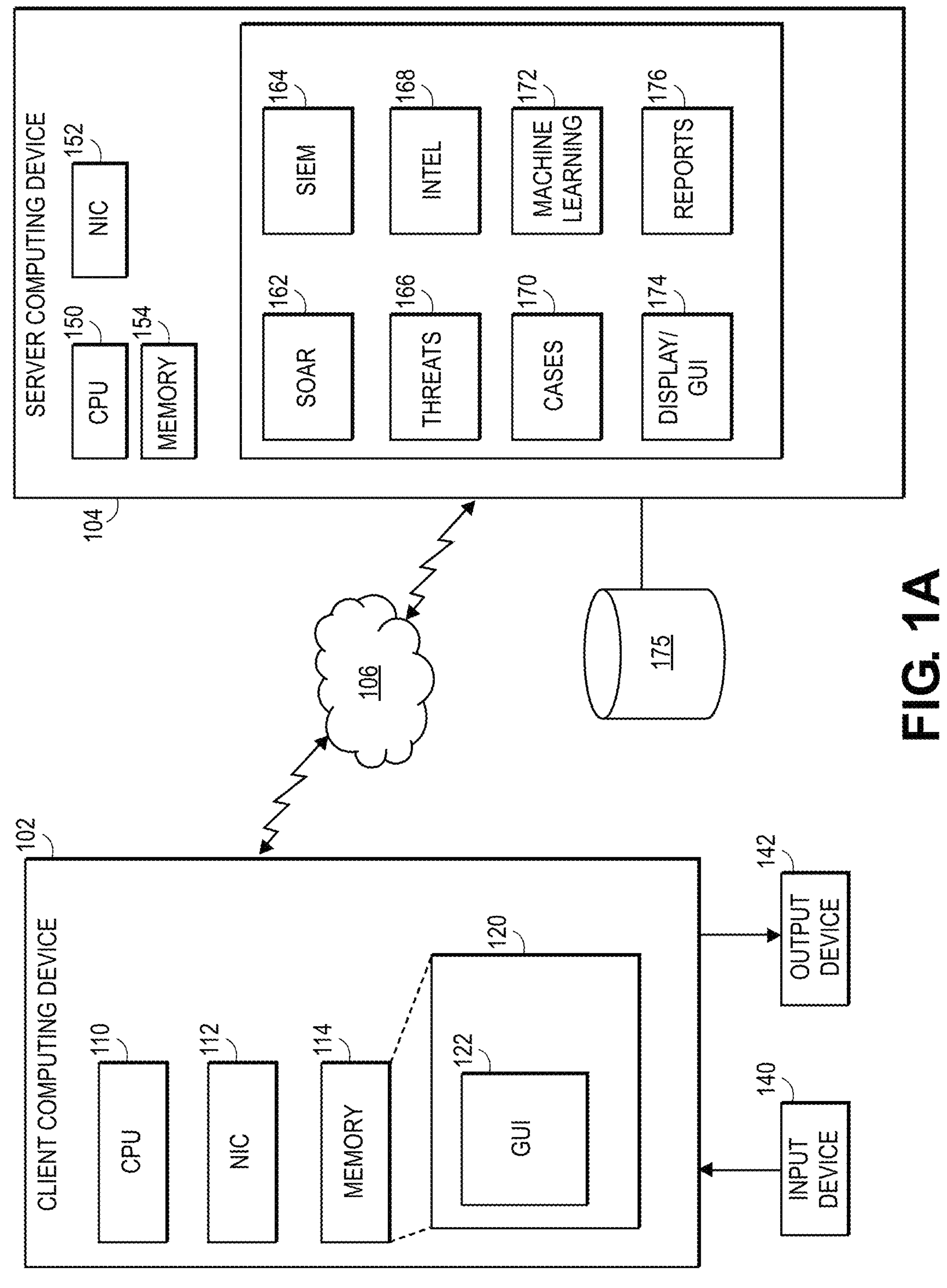
FIG. 1A depicts an exemplary computing environment in which methods and systems for improved security threat analysis may be implemented, according to some aspects.

FIG. 1A depicts an exemplary computing environment 100 in which the techniques disclosed herein may be implemented, according to an embodiment. The environment 100 includes a client computing device 102, a server 104, and a network 106. Some embodiments may include a plurality of client computing devices 102 and/or a plurality of servers 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the server 104, and/or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules 120, including a graphical user interface (GUI) module 122 that may be part of an interactive application (e.g., a mobile application) accessed by a user.

The client computing device 102 further includes an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the server 104, an electronic database, etc.).

The one or more modules 120 implement specific functionality. For example, in an embodiment, the GUI module 122 includes computer-executable instructions that, when executed, cause a computer to display information (e.g., a web page, a computing application, data, etc.) on a computing screen (e.g., via the output device 142). In an embodiment, the GUI module 122 receives input from the input device 140. For example, the GUI module 122 may receive an image via an input device 140 (e.g., a security-related input device, such as an intrusion detection system (IDS)

appliance). The GUI module 122 may receive typed information via a touch screen or keyboard input device 140. The GUI module 122 may include instructions for storing input (e.g., in the memory 120). The GUI module 122 may include instructions for transmitting the input via the network 106.

The server 104 includes a processor 150 and a network interface controller (NIC) 152. The server 104 may further include a database 175. The database 175 may be a structured query language (SQL) database (e.g., a MySQL database, an Oracle database, etc.) or another type of database (e.g., a not only SQL (NoSQL) database). The server 104 may include a library of client bindings for accessing the database 175. In some embodiments, the database 175 is located remotely vis-a-vis server 104. For example, the database 175 may be implemented using a RESTdb.IO database, REDIS database, MongoDB database, etc.

The processor 110 may include any suitable number of processors and/or processor types, such as CPUs and one or more graphics processing units (GPUs). Generally, the processor 150 is configured to execute software instructions stored in a memory 154. The memory 154 may include one or more persistent memories (e.g., a hard drive/solid state memory) and stores one or more set of computer executable instructions/modules 160, including a SOAR (e.g., IBM Security™ QRadar® SOAR) module 160, a SIEM 164 module, a threats module 166, an intelligence module 168, a case management module 170, a machine learning training and operation module 172, a display/GUI module 174 and a reports module 176. Each of the modules 160 implements specific functionality related to the present techniques. In some aspects, a plurality of the modules 160 may implement a particular technique. For example, the SOAR module 162 and the SIEM module 164 may be combined or otherwise implemented together, in some aspects. The one or more modules 160 FIG. 1 will now be described with respect to exemplary aspects.

Generally, the SOAR module 162 may include a set of computer-executable instructions for providing security personnel at the company with automated case management for security and/or privacy events that occur within the company's network infrastructure. The SOAR module 162 may include a set of computer-executable instructions for facilities for automating and documenting incident response plans, statistics and newsfeeds, tasks, incidents, and dashboards. In some aspects, the SOAR module 162 may be configured to receive and execute one or more trained machine learning models.

The SIEM 164 may include a set of computer-executable instructions for detecting, analyzing and responding to security threats. The SIEM may include sets of computer-executable instructions for normalization, analytics and caching. In some aspects, the SIEM may monitor external users, internal server infrastructure, and perimeter infrastructure. In some aspects the SIEM may include sets of computer executable instructions for monitoring end users and desktop computers. For example some of the functions that the SIEM may perform across the company may include antivirus, antispyware, network access control, wireless security, disk encryption, and other security policies. The SIEM may provide the SOAR with data feeds (referred to herein as electronic security data) regarding the foregoing security functions and/or any other suitable security-related functions.

The threats module 166 may include a set of computer-executable instructions for annotating information from the SOAR 162 and/or the SIEM 164. For example, the threats module 166 may include information for enriching data from the SOAR 162 and the SIEM 164, using proprietary information available only to the company (e.g., internal IP address to host mappings). The threats module may receive and annotate such information, e.g., via an API or by asynchronous access to a database (e.g., the database 175).

The case management module 170 may include a set of computer-executable instructions for storing information about cases or incidents in the form of electronic tickets, as discussed below. The case management module 170 may include a set of computer-executable instructions enabling users to create, edit, update and delete tickets via the device 102 and/or via the device 104. For example, a user may designate a particular ticket in a ticketing system as being a true positive or a false negative. The case/incident management may store the tickets in the database 175.

The machine learning training and operation module 172 may include a set of computer-executable instructions for training and/or operating one or more machine learning models, including one or more ensemble models and/or one or more random forest models. Herein, "training" includes related operations such as hyperparameter optimization and cross-validation.

For example, the machine learning training and operation module 172 may include sets of instructions for training and operating one or more models such as classification models, supervised machine learning (ML) models, unsupervised models, etc. In general, the machine learning training and operation module 172 creates new ML models, loads data (e.g., training data, trained models, etc.), trains the ML models and/or stores the trained models. The machine learning training and operation module 172 includes instructions for loading trained ML models and associated ML parameters (e.g., artificial neural network weights), and ML operation data. The ML training module 120 may construct an ML model, train the ML model, and pass the trained ML model to another module for use. In some aspects, one or more libraries may be included in the machine learning training and operation module 172 and used to facilitate model training and operation (e.g., TensorFlow, ScikitLearn, etc.).

The display/GUI module 174 may include a set of computer-executable instructions for displaying security-related information to users. For example, the display/GUI module 174 may cause a security threat diagnosis to be displayed on the GUI 122 or on a GUI of the server computing device 104 (not depicted).

The reports module 176 may include a set of computer-executable instructions for generating one or more electronic documents related to security information (e.g., an email, a PDF file, etc.).

Figure 1B:
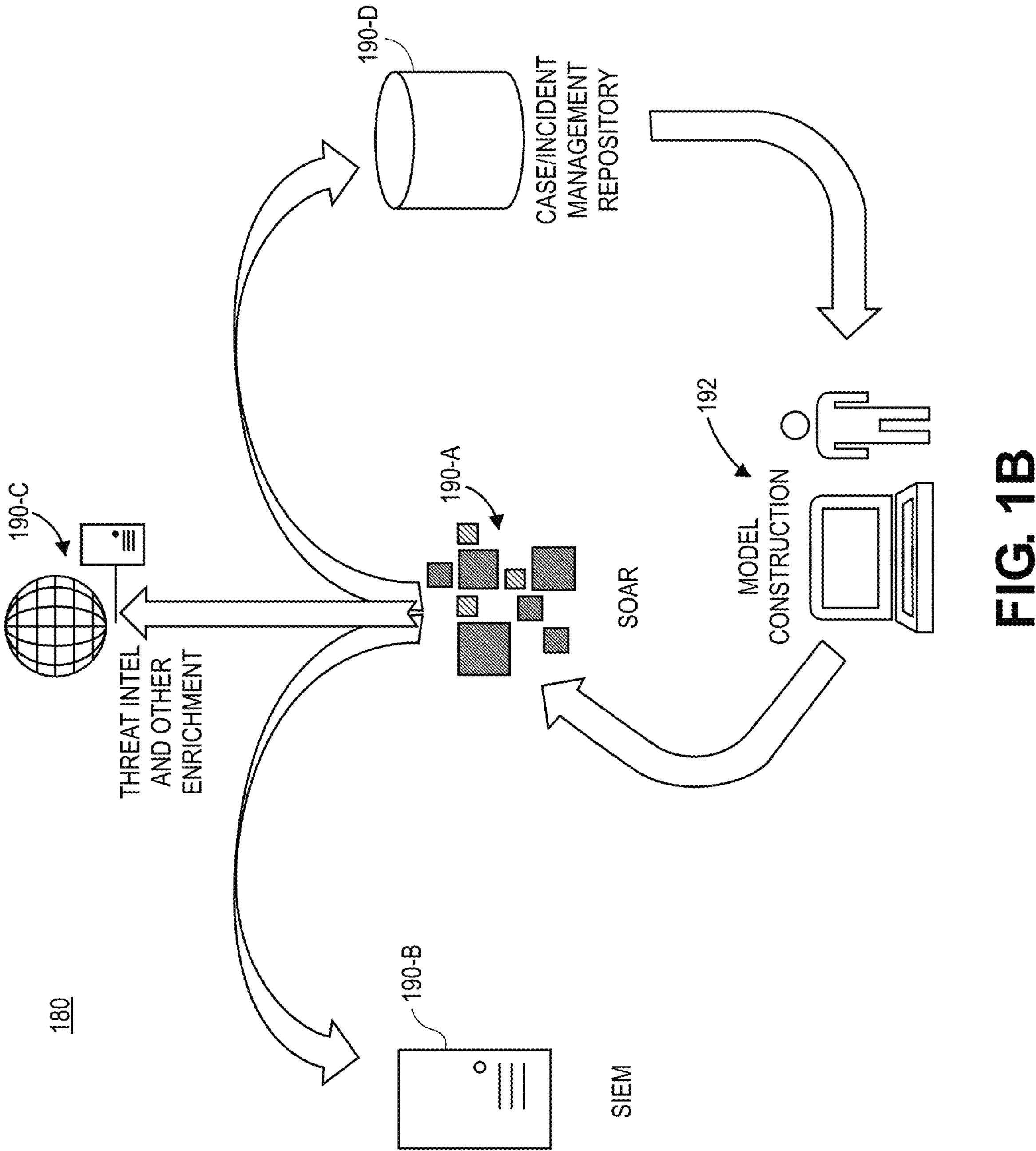
FIG. 1B depicts an exemplary computing environment corresponding to the computing environment of FIG. 1A, that may include multiple security components, according to some aspects.

The operation of the modules 160 will now be further described with respect to FIG. 1B, according to some aspects. FIG. 1B depicts an exemplary computing environment 180 corresponding to the computing environment of FIG. 1A, that may include multiple components, according to some aspects. Specifically, FIG. 1B includes a SOAR 190-A that may receive information from one or more client security tool 190-B. For example, the information may be electronic security data (e.g., offenses, messages, notables, alerts, etc.). The client security tool 190-B may be a security information and event management (SIEM) system that aggregates security information across an organization and/or performs other security related functions to help security teams detect and respond to security events. Many SIEMs are developed as proprietary and open source software, and the present techniques may include and/or interface with those. In some cases, the security tool 190-B may be a different device/system, such as a microservice developed in-house for a specific security-based application. The SOAR 190-A and SIEM 190-B may correspond to the modules 162 and 164 of FIG. 1A, respectively.

The environment 180 may further include an intelligence and enrichment system 190-C that includes threat intelligence and other enrichment capabilities, in some aspects; a case management tool 190-D that includes incident management repository or database, and a machine learning model training and/or construction system 192. These components of FIG. 2B may correspond, respectively, to the threats module 166 and intel module 168, cases module 170 and machine learning module 178 of FIG. 1A, in some aspects.

Each of the components of FIG. 1B may be interconnected and communicatively coupled, enabling simultaneous, bidirectional, multiplexed communication between any components. The case management tool 190-D may correspond to the database 175 of FIG. 1A, in some aspects. The machine learning model training and/or construction system 192 may train and/or operate one or more machine learning models (e.g., a model used for classifying electronic security data). In some aspects, multiple models may be trained and used in an ensemble and/or in a random forest configuration. As noted, doing so results in an improvement over conventional systems that are rigid and not able to respond to multiple security threats in a multi-faceted and hybrid threat environment.

In operation, the SOAR 190-A receives electronic security data from the security tool 190-B. The SOAR 190-A enriches the electronic security data by adding information from the intelligence and enrichment system 190-C, and creates an entry (e.g., a ServiceNow ticket) in the memory of the server computer 104 of FIG. 1A. The ticket may be categorized by a human as indicating whether the electronic security data corresponds to a true or false positive security event (i.e., a benign or malignant security event).

For example, the SOAR 190-A may extract information from the electronic security data (e.g., IP address, domain name, user agent string, etc.) and provide that extracted information to the intelligence and enrichment system 190-C, which can use that information to provide security enrichment data (e.g., whether a given IP address appears on a greylist, whether a user agent string is likely fabricated, whether a domain name is spoofed or include authenticated DNS information, etc.).

Next, the SOAR 190-A or another component may store the enriched electronic security data and/or the original, unenriched electronic security data in one or more databases, such as the case management tool 190-D, where the ticket may be processed by a human. In this mode, the human initially creates a labeled dataset of tickets or other records that may be used as training data.

For example, the ML model system 192 may retrieve the electronic security data stored in tickets, along with the status data (i.e. labels), and that information to train and/or operate one or more machine learning models, as discussed herein. When certain conditions are met, for example, when a trained machine learning model determines that there is a security threat diagnosis, the ML model system 192 may generate an alert, display information, etc. For example, this portion of the ML model system 192 may correspond to the display module 170 and/or reports module 172 of FIG. 1A.

After one or more ML models are trained, by the time the enriched electronic security data and/or unenriched electronic security data is received at the SOAR 190-A, the ML model system 192 may have already trained one more modules using the previously-received/stored (e.g., historical) electronic security data. The training may use data stored in the case management tool 190-D. Here, the ML model system 192 is operating in inference mode, and instead of storing the ticket information in the case management tool 190-D for human labeling, the ML model system 192 infers, based on the trained model, whether the electronic security data corresponds to a false or true positive and/or malignant/benign event, and stores that prediction with the electronic security data in a new ticket.

In some aspects, at this stage the model training may be resumed, by performing re-training of a model based on user input (e.g., via the input device 140 of FIG. 1A). In this way, when the SOAR stores the data from the SIEM 190-B, it can make a prediction as to whether the electronic security data is likely to be a true or false positive, and include that data in the stored electronic security data at the time the data is saved (e.g., as a prediction field in a ticket), thus preventing a human from becoming fatigued by reviewing the large volume of electronic security data, much of which includes false positives, and instead only alerting a human when there is a potential issue.

Exemplary Computer-Implemented Model Training and Optimization

FIG. 2A depicts exemplary labeled training data used to train one or more machine learning models for improved security threat analysis, to avoid threat fatigue, according to some aspects. The training data may be stored in a CSV file of security incidents that corresponds, for example, to the case management tool 190-D of FIG. 1B. The training data my include an indexed plurality of tickets (e.g., rows or entries) each having a description, details and a status, wherein the status constitutes the label for purposes of training the machine learning model. The labels may be a binary label indicative of whether a given row represents a true positive yet benign security event/incident or a false positive. In some aspects, a third label (true positive-malicious) may be used.

FIG. 2B depicts security ticket details included in the labeled training data of FIG. 2A, according to some aspects. The security ticket details are represented as a string of JavaScript Object Notation (JSON) but any suitable encoding scheme may be used (XML, web scraped, etc.). Where online learning is used, as described above, training data may be retrieved from the database and injected directly into the model being trained.

In FIG. 2A, the details column is (excluding the index column) the second (1st in zero-based notation) column (wherein the description column is the 0th column, and the status column is the 2nd column). The security ticket details depicted in FIG. 2B include both the description and details fields of the training data of FIG. 2A (columns 1 and 2). Specifically, these two fields have been merged for the first row in the depicted example. The security ticket details and description of FIG. 2A are used as labeled training data, and the example of FIG. 2B is labeled in FIG. 2A as "True Positive-Benign" (the 0th row). The merged security ticket details include, for example, an alert identifier, a start time, an alert description, an alert criticality, alert categories, an alert first timestamp, an alert last timestamp, an alert type, an alert index, a source IP address, a destination IP address, and a magnitude. In some aspects, more/fewer/different fields may be used for training.

Figure 2C:
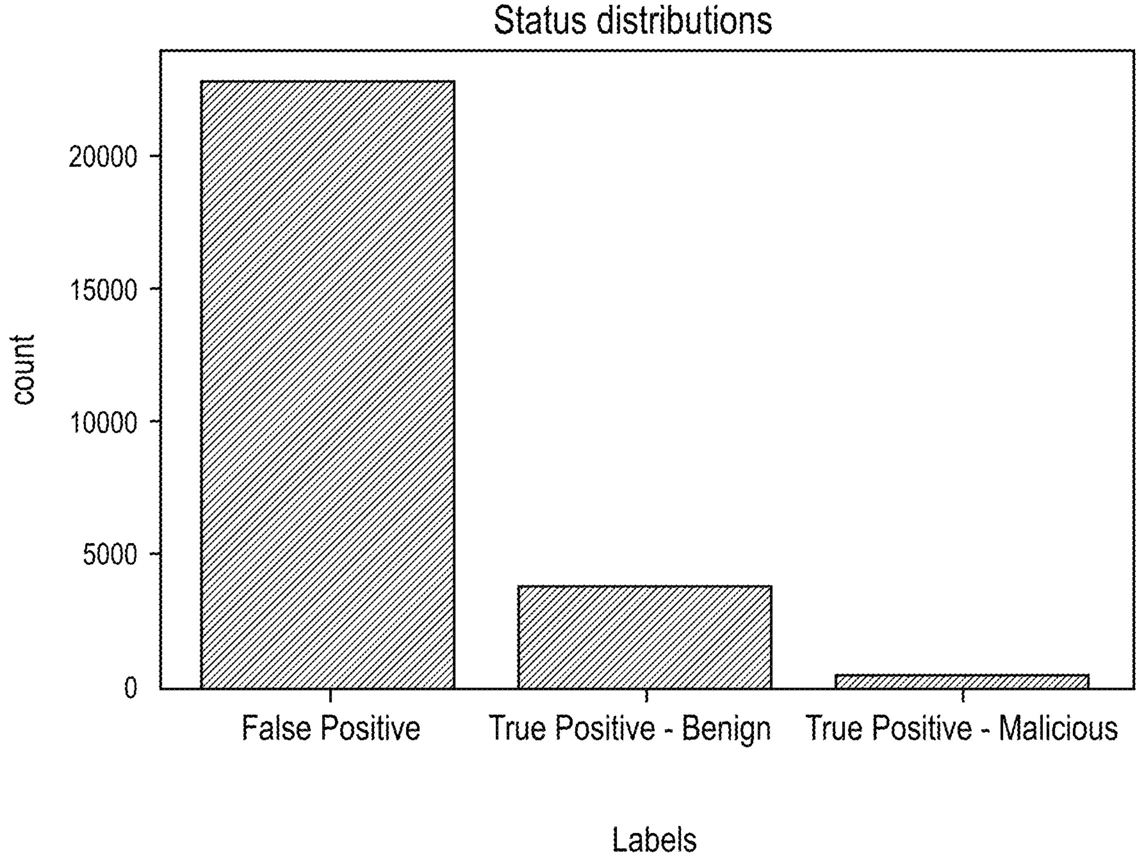
FIG. 2C depicts an example of status distribution of the labeled training data that may be used in some aspects.
Figure 2D:
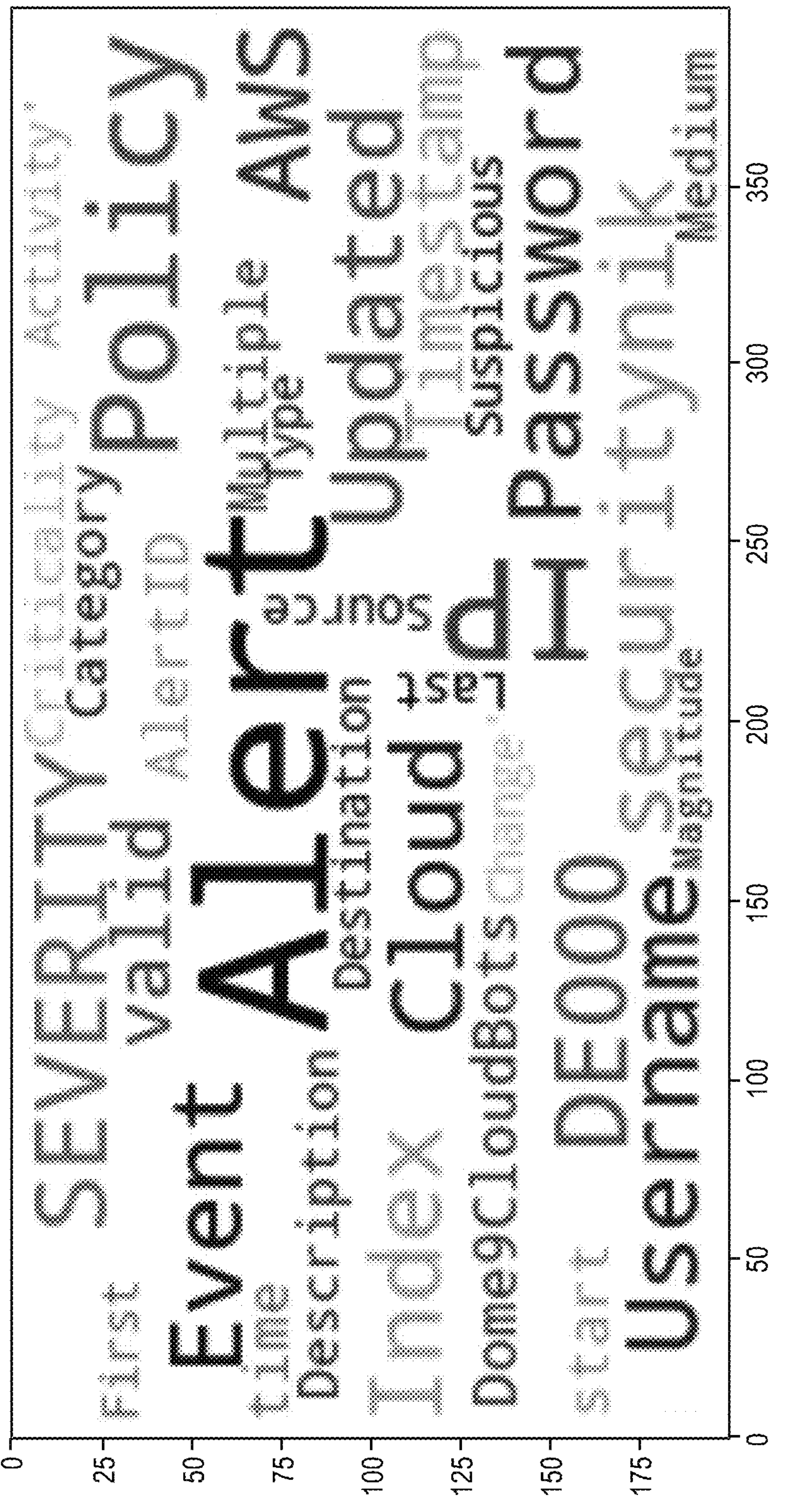
FIG. 2D depicts and example word map showing word frequency, according to some aspects.

The present technique may perform word-based encodings/embeddings for training the machine learning model. For example, FIG. 2C depicts an example of status distribution of the labeled training data that may be used in some aspects. FIG. 2C includes positive class labels, that the model learns to predict. The model learns to ignore words in the majority class of false positives, as shown in FIG. 2D. The words that are most frequent in alerts are those that the model may be trained to ignore. For example, every training datum like the one shown in FIG. 2B includes the word "Alert" as part of the "Alert Type" and "Alert Index" key, regardless of what those respective values are in the training data. As such, these terms are more noise than signal, and the model may be trained, in some aspects, to ignore these words.

Figure 2F:
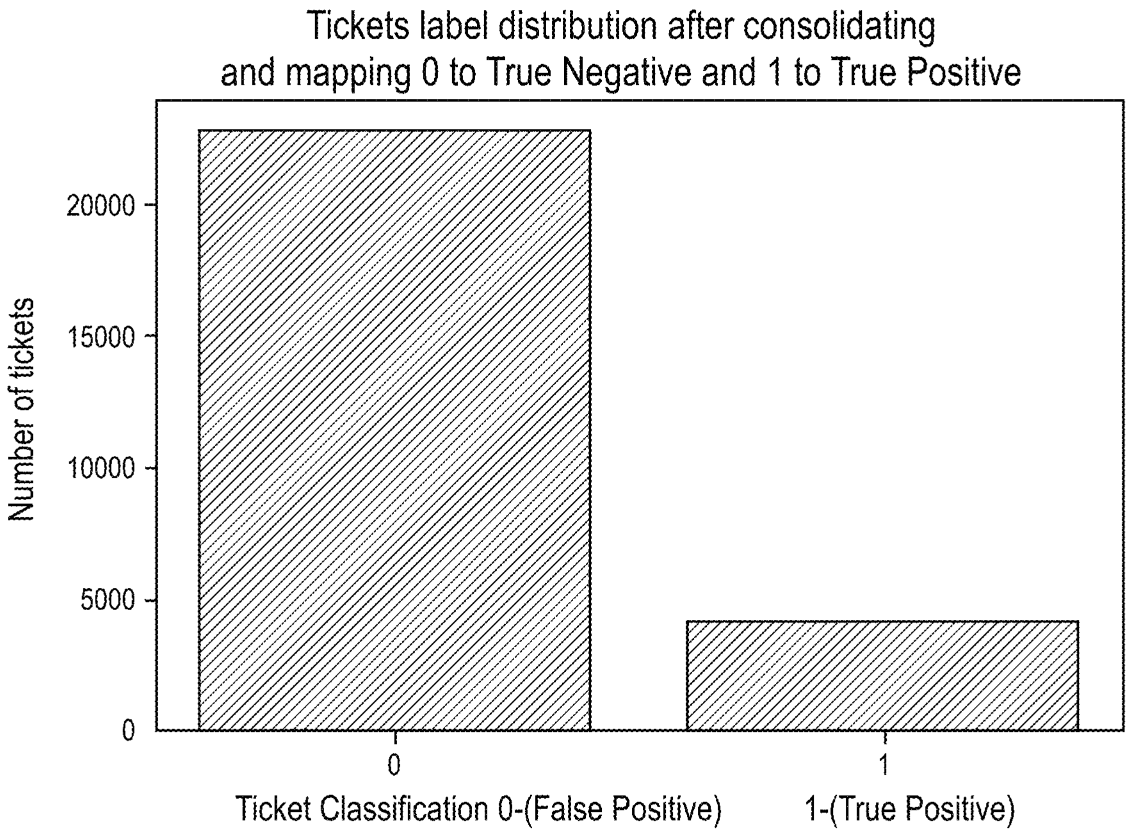
FIG. 2F depicts example label consolidation and mapping, according to some aspects.

To train the model to correctly weight words, the present techniques may perform word tokenization, as shown in FIG. 2E. Tokenization is the process of breaking a sentence into words, which may include punctuation and stop words. In some aspects, punctuation and stop words may be removed. The present techniques may include consolidating the true positive, malicious and true positive, benign training examples into a single positive class as shown in FIG. 2F (right column). This enables the prediction problem to be modeled as a binary classification problem, when that is the desired output.

The present techniques may include performing term frequency inverse document frequency (TFIDF) vectorization of the tokenized training data. In general, TFIDF is a technique that ranks the importance of words in a corpus according to their respective frequency. For example, FIG. 2G depicts an example of vectorizing data. From a security standpoint, the intuition behind using TFIDF vectorization is then if or when an organization's security is breached, the bad actor is likely one that does not interact with the organization on a regular basis. For example, this bad actor likely will not have an IP address or domain name, etc., that is very familiar to the organization. In the example corpus, the terms paper and scissor have higher values because they are less frequent in the corpus. Likewise, when applied to the labeled training data, those security features (e.g., IP addresses) that are rarer in the positive class will have higher scores.

FIG. 2H depicts an example of training a machine learning model using TFIDF vectorization, according to some aspects. The training may be performed by the machine learning module 178 of FIG. 1A, for example. In the depicted example, a number of different modeling algorithms may be used to generate ensemble models, in some aspects. For example, naive Bayes, logistic regression and/or adaptive boosting classification may be used to create individual pipelines and/or to add them together to train an overall model. In this way, the models may be compared for performance. The training data (X_train) may be the combined description and details shown in FIG. 2B, and the label (y_train) may be the respective status shown in FIG. 2A. As discussed, the y_train may be represented as a binary class, in some aspects (e.g., True/False; 0, 1). The model may learn to associate the training data and labels, such that it is able to make predictions based on de novo data the resembles the training data (i.e., de novo examples of electronic security data).

TABLE 1

| | precision | recall | f1-score | support |
|---|---|---|---|---|
| 0 | 0.86 | 1.00 | 0.92 | 6855 |
| 1 | 0.82 | 0.11 | 0.19 | 1246 |
| accuracy | | | 0.86 | 8101 |
| macro avg | 0.84 | 0.55 | 0.56 | 8101 |
| weighted avg | 0.85 | 0.86 | 0.81 | 8101 |

The trained model may be evaluated for accuracy, the ratio of correct predictions to the number of predictions. Or in the case of a binary classification problem, the ratio of true positives and true negatives, to true positives, true negatives, false positives and false negatives. Evaluation metrics corresponding to initial testing resulted in accuracy of ~85%, as shown in Table 1. This might seem at first glance to be useful, perhaps even excellent. However, the security class training data is class-imbalanced, meaning that there are many more false positives than true positives. In some aspects, the present techniques may generate synthetic true positives to balance the two classes. Weighting of the labeled training data sets may also be used to assign weights to the training data during training to overcome this problem.

Figure 2I:
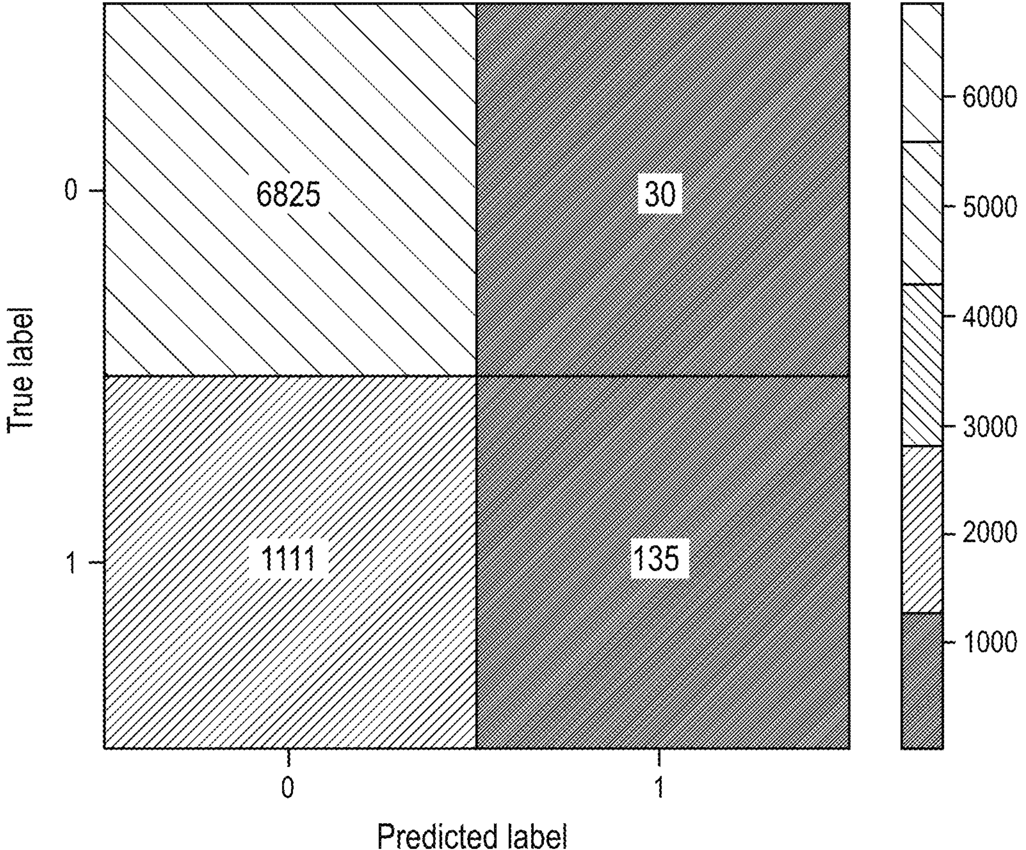
FIG. 2I depicts an example prediction matrix, according to some aspects.

FIG. 2I depicts some a prediction matrix for the techniques described thus far. Beginning at the top right quadrant and working clockwise are: false positive, true positive, false negative and true negative. The bottom left quadrant, true false negative, is the nightmare scenario for security practitioners. Essentially, this means that a malicious actor is in the network infrastructure, and the security practitioner has insufficient awareness. The model with accuracy of 85% turns out to perform very poorly, because many false negative events are not correctly classified, only 135 were predicted as true positive, and 30 were predicted as false positive. The concept of how many actual positives were correctly predicted is a predictive metric known as recall. In the example of FIG. 2I, the tool only correctly predicted 11% of the threats. Thus, the present techniques may, in some aspects, seek to improve the model for security applications by maximizing recall, via performing further model optimization, as shown in FIG. 2J.

FIG. 2J depicts an example of machine learning model optimization for security-conscious applications, according to some aspects of the present techniques. The process of optimizing the machine learning model as shown in FIG. 2J may include searching for a set of hyperparameters that improve upon the model depicted in FIG. 2H, for example. The hyperparameters may include n-grams, to train using the tokens depicted in FIG. 2E. For example, an 1-gram may use each of the words in FIG. 2E independently. A bigram may use every combination of two words, etc. Other parameters that may be set include max df, max features, penalty, solver and class weight. The class weight corresponds to the concept discussed above of weighting the training sets based on their respective size. The optimization may also use cross-validation, by splitting the data into training and test sets. On each training iteration, a portion of the training data may be held back and used for testing. This process may be repeated multiple times (e.g., five times as depicted). The optimization may also score based upon recall, in some aspects.

In the optimized modeling example, a significant improvement was found in empirical testing. Recall was dramatically improved using this approach, as shown in FIG. 2K and Table 2.

TABLE 2

| | precision | recall | f1-score | support |
|---|---|---|---|---|
| 0 | 0.98 | 0.58 | 0.73 | 6855 |
| 1 | 0.29 | 0.94 | 0.44 | 1246 |
| accuracy | | | 0.63 | 8101 |
| macro avg | 0.63 | 0.76 | 0.58 | 8101 |
| weighted avg | 0.87 | 0.63 | 0.68 | 8101 |

Figure 2K:
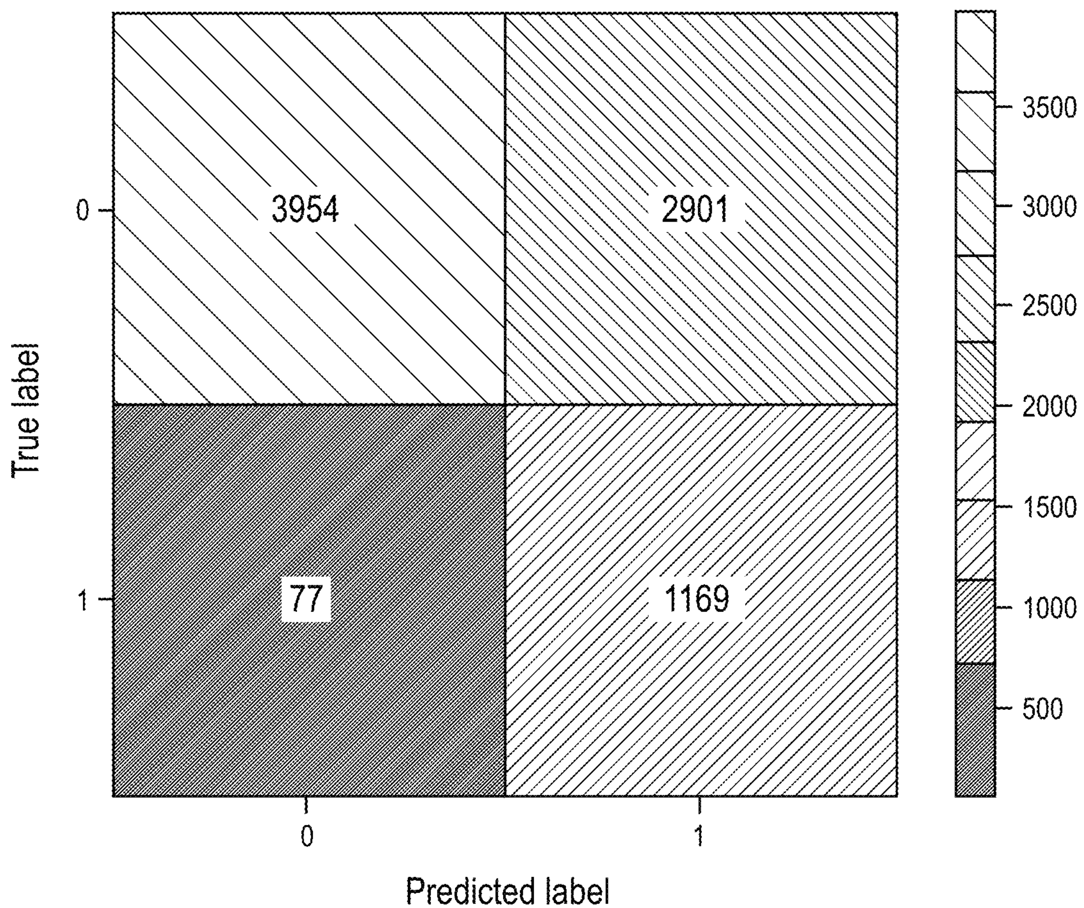
FIG. 2K depicts an example improved optimized prediction matrix, according to some aspects.

Specifically, FIG. 2K depicts the prediction matrix of FIG. 2I, improved by the optimization technique described with respect to FIG. 2J. By focusing the model optimization on recall, the present techniques show some willingness to accept false positives, but not false negatives. Recall improved to 94%. The number of false positives increased as well, but from a security practitioner's perspective, this increase only added to an already large number of false positives generated by tools like the SIEM 190-B of FIG. 1B. And further, increasing the number of true negatives to a larger number is a welcome development brought about by the optimized modeling approach.

The improvements brought about by the present techniques should by this point be evident. In particular, using the optimized approach highlighted above, a team of analysts may only need to manually review a relatively small number (e.g., 77) of false negatives instead of a formerly relatively gigantic number (e.g., 1111) of false negatives. The trained model(s) may be stored (e.g., by being pickled), transferred, loaded and reused to test new data. Generally, a binary classification model trained using the present techniques outputs a 1 for a predicted true positive or a 0 for a predicted false positive.

The examples of machine learning discussed herein are intentionally simplified for explanatory purposes. For example, in a production system, the present techniques may employ an ensemble model having a number (e.g., five) of models each of which generate a prediction as discussed above. These models may then be analyzed by a component that weights their individual outputs. In some aspects, this ensemble of models may be a voting model that generates a consensus output regarding classification of the electronic security data. In still further embodiments, different optimization algorithms may be selected (e.g., at runtime) to emphasize different aspects of the classification task.

Figure 2L:
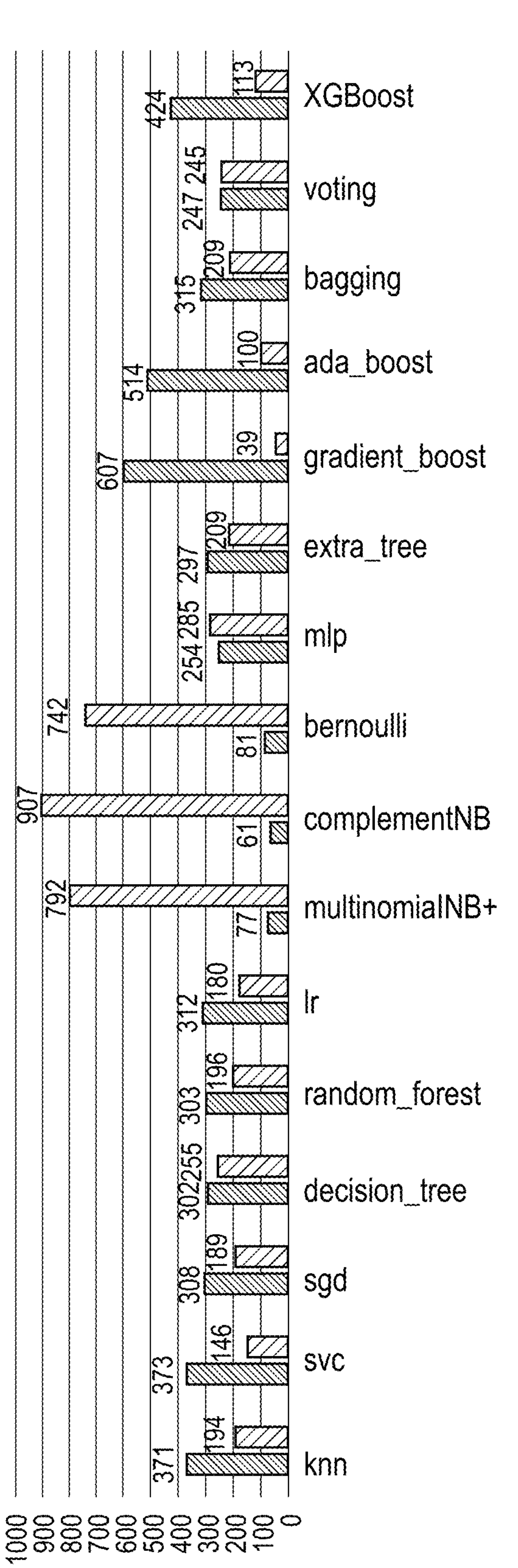
FIG. 2L depicts an example confusion matrix using bag-of-words vectorizing, according to some aspects.
Figure 2M:
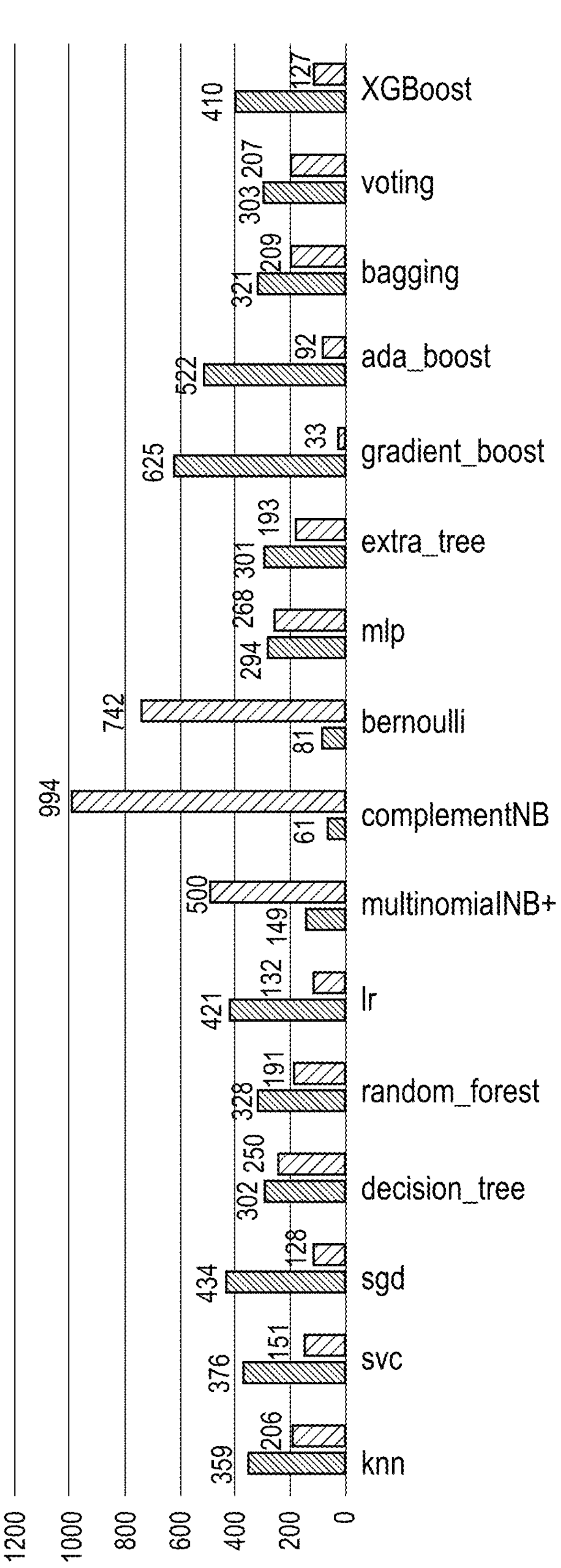
FIG. 2M depicts an example confusion matrix using TFIDF vectorizing, according to some aspects.
Figure 2N:
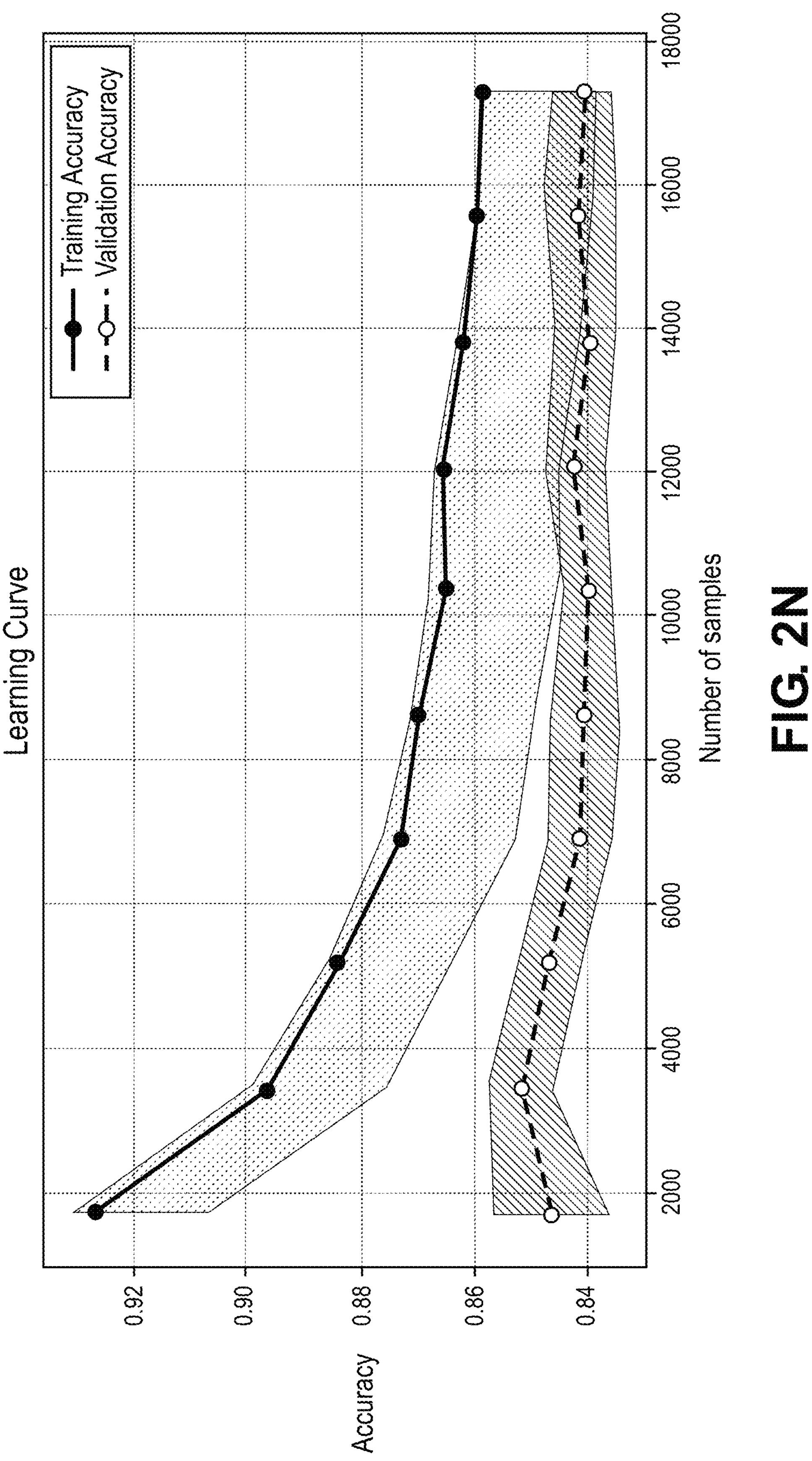
FIG. 2N depicts an example of training and validation accuracy in response to the number of training samples, according to some aspects.

Furthermore, the selection of components used in the preparation of the machine learning data for training may affect the performance of the overall process. FIG. 2L depicts an example confusion matrix for CountVectorizer (an alternative to TFIDF that uses a bag-of-words approach), with a focus on misclassifications. As shown, in this example, multinomial naive Bayes and complement naive Bayes perform the best, in terms of minimizing false negatives. FIG. 2M depicts an example confusion matrix for using TFIDF for the same task, and here, Bernoulli steps into second place, displacing multinomial naive Bayes. The present techniques may benefit from further tweaking and adjustment when the electronic security data is presented in a form other than tokenized tickets. Also, in general, the accuracy (and recall) of the present techniques may improve as the number of samples increases, as shown in FIG. 2N.

Exemplary Computer-Implemented Methods

Figure 3:
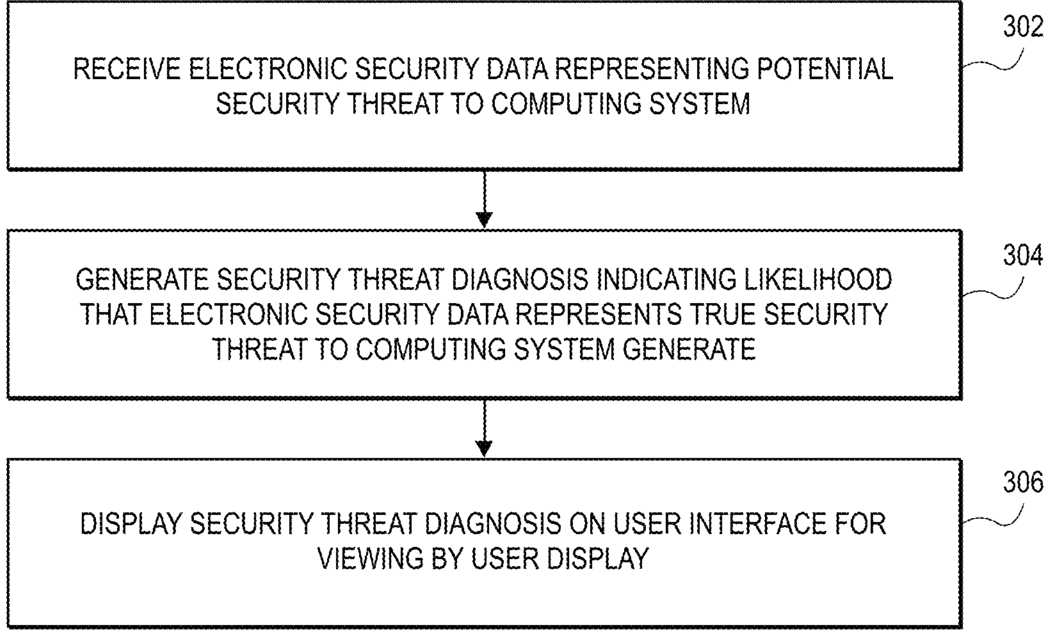
FIG. 3 depicts an exemplary computer-implemented method for improved security threat analysis, according to some aspects.

FIG. 3 depicts an exemplary computer-implemented method 300 for improved security threat analysis, according to some aspects. The method 300 may be performed, for example, by the modules 160 of FIG. 1. In some aspects, machine learning training and/or operation may be performed by the client computing device 102 and/or the server computing device 104.

The method 300 may include receiving, at one or more processors, electronic security data representing a potential security threat to a computing system (block 302). In some aspects, the electronic security data includes at least one security ticket having a plurality of data sections. In some aspects, the method 300 may include condensing, by one or more processors, the plurality of data sections from the security ticket into a condensed data entry; and generating, by one or more processors executing the ML model, the security threat diagnosis based on the condensed data entry.

The method 300 may include generating, by processing the electronic security data using a machine learning (ML) model, a security threat diagnosis indicating a likelihood that the electronic security data represents a true security threat to the computing system (block 304). In some aspects, the ML model comprises a plurality of ML models that are each trained with respective training electronic security data as input to generate a respective plurality of training security threat diagnoses as outputs. For example, training electronic security data used as input to train the model may be selected from historical training electronic security data collected over time and manually or automatically labeled by severity/positivity, as depicted in FIG. 2A. The ML model may be an ensemble model and/or a random forest model.

In some aspects, when the likelihood that the security ticket represents the true security threat to the computing system satisfies a likelihood threshold, the security threat diagnosis indicates at least one of: (i) the true security threat is a benign true security threat, or (ii) the true security threat is a malicious true security threat. In some aspects, when the likelihood that the security ticket represents the true security threat to the computing system does not satisfy the likelihood threshold, the security threat diagnosis indicates that the security ticket represents a false security threat.

In some aspects, generating the security threat diagnosis in the method 300 further includes generating, by one or more processors executing the ML model, a plurality of security threat diagnoses, wherein each security threat diagnosis from the plurality of security threat diagnoses corresponds to a respective ML model of the plurality of ML models; and determining, by the one or more processors, a consensus security threat diagnosis based on the plurality of security threat diagnoses.

In some aspects, the plurality of ML models includes three or more ML models, and determining the consensus security threat diagnosis further includes determining, by one or more processors, a majority security threat diagnosis based on the plurality of security threat diagnoses; and designating, by one or more processors, the majority security threat diagnosis as the consensus security threat diagnosis.

In some aspects, the method 300 includes receiving, at one or more processors, a user input including one or both of (i) a true positive value and (ii) a false negative value corresponding to a plurality of security threat diagnoses generated by the ML model; and re-training, by the one or more processors, the ML model based on the user input.

In some aspects, the ML model is an ensemble model and the plurality of ML models composing the ML model includes at least one of: (i) a Complement Naive Bayes model, (ii) a Bernoulli Naïve Bayes model, (iii) a stochastic gradient descent model, (iv) a K-Nearest Neighbors model, (v) a logistic regression model, or (vi) an Adaptive Boost ensemble learning model. In some aspects, the ML model is a random forest classifier model.

In some aspects, the method 300 includes training, by one or more processors, the ML model by: tokenizing, by one or more processors, data from each training security threat in accordance with an inverse document frequency paradigm; and vectorizing, by one or more processors, the tokenized data to create a plurality of vector values corresponding to the plurality of training security threat diagnoses with magnitudes dependent on the inverse document frequency paradigm. Tokenizing and vectorizing are discussed above, with respect to FIG. 2G and FIG. 2I, for example.

The method 300 may include (a) determining, by one or more processors, a set of hyperparameters corresponding to each respective ML model of the plurality of ML models; (b)

executing, by one or more processors based on the set of hyperparameters, each ML model of the plurality of ML models using the respective plurality of training security tickets; (c) determining, by one or more processors, a respective score for each ML model of the plurality of ML models based on the executing; (d) modifying, by one or more processors, a portion of the set of hyperparameters; (e) iteratively performing, by one or more processors, steps (b)-(d) until a cross-validation threshold is satisfied; and/or (f) determining, by the one or more processors, an optimal set of hyperparameters based on a highest respective score achieved.

The method 300 may include displaying, by one or more processors, the security threat diagnosis on a user interface for viewing by a user (block 306).

Exemplary Random Forest Aspects

In some aspects, the present algorithms may be updated and present models implemented using a Random Forest algorithm, rather than a more heterogeneous ensemble approach that incorporates various algorithms. For example, rather than using a model that includes multiple algorithms to build the ensemble, these one or more models may be consolidated to focus on Random Forest for simplicity and efficiency. Specifically, the infrastructure may be simplified, allowing for a more focused approach to machine learning operations (MLOps). Despite the algorithm change, the process for preparing data (tokenizing, vectorizing) may remain unchanged. This uniform process is applicable irrespective of the machine learning (ML) or deep learning (DL) model employed.

Data preparation and model training may also remain consistent with the approaches described herein, utilizing ticket data for training purposes. This data is essential for the problem addressed and is the basis for predictions. Using Random Forest, individual trees may be trained. While each tree may be trained using the same data, each tree may be trained differently to ensure diverse perspectives within the model.

Training the random forest model may include defining a pipeline with a RandomForestClassifier, the pipeline including a TfidfVectorizer and a RandomForestClassifier. These components may, respectively, convert a collection of raw documents to a matrix of TF-IDF features and train a classifier on the TF-IDF features. Parameters of both TfidfVectorizer and RandomForestClassifier may be adjusted, including the number of trees in the forest.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for improved security threat analysis, the method comprising:

receiving, at one or more processors, electronic security data representing a potential security threat to a computing system;

generating, by processing the electronic security data using a machine learning (ML) model, a security threat diagnosis indicating a likelihood that the electronic security data represents a true security threat to the computing system, wherein the ML model includes a plurality of ML models that are each trained with respective electronic security data as input to generate a respective plurality of training security threat diagnoses as outputs;

generating, by one or more processors executing the ML model, a plurality of security threat diagnoses, wherein each security threat diagnosis from the plurality of security threat diagnoses corresponds to a respective ML model of the plurality of ML models; and determining, by the one or more processors, a consensus security threat diagnosis based on the plurality of security threat diagnoses; and displaying, by one or more processors, the consensus security threat diagnosis on a user interface for viewing by a user.

2. The computer-implemented method of claim 1, wherein the electronic security data includes at least one security ticket having a plurality of data sections, and further comprising:

condensing, by one or more processors, the plurality of data sections from the security ticket into a condensed data entry; and generating, by one or more processors executing the ML model, the security threat diagnosis based on the condensed data entry.

3. The computer-implemented method of claim 2, wherein:

when the likelihood that the security ticket represents the true security threat to the computing system satisfies a likelihood threshold, the security threat diagnosis indicates at least one of:

(i) the true security threat is a benign true security threat, or (ii) the true security threat is a malicious true security threat; and when the likelihood that the security ticket represents the true security threat to the computing system does not satisfy the likelihood threshold, the security threat diagnosis indicates that the security ticket represents a false security threat.

4. The computer-implemented method of claim 1, wherein the plurality of ML models includes three or more ML models, and wherein determining the consensus security threat diagnosis further comprises:

determining, by one or more processors, a majority security threat diagnosis based on the plurality of security threat diagnoses; and designating, by one or more processors, the majority security threat diagnosis as the consensus security threat diagnosis.

5. The computer-implemented method of claim 1, further comprising:

receiving, at one or more processors, a user input including one or both of (i) a true positive value and (ii) a false negative value corresponding to a plurality of security threat diagnoses generated by the ML model; and re-training, by the one or more processors, the ML model based on the user input.

6. The computer-implemented method of claim 1, wherein the machine learning model is an ensemble ML model; and wherein the plurality of ML models composing the ensemble ML model includes at least one of: (i) a Complement Naïve Bayes model, (ii) a Bernoulli Naïve Bayes model, (iii) a stochastic gradient descent model, (iv) a K-Nearest Neighbors model, (v) a logistic regression model, or (vi) an Adaptive Boost ensemble learning model.

7. The computer-implemented method of claim 1, wherein the machine learning model is a random forest ML model.

8. The computer-implemented method of claim 1, further comprising:

training, by one or more processors, the ML model by:

tokenizing, by one or more processors, data from each training security threat in accordance with an inverse document frequency paradigm; and vectorizing, by one or more processors, the tokenized data to create a plurality of vector values corresponding to the plurality of training security threat diagnoses with magnitudes dependent on the inverse document frequency paradigm.

9. A system for improved security threat analysis, comprising:

a user interface;

one or more processors; and a non-transitory, computer-readable memory coupled to the one or more processors and the user interface, the memory having stored thereon instructions that, when executed by the one or more processors, cause the one or more processors to:

receive electronic security data representing a potential security threat to a computing system;

generate, by processing the electronic security data using a machine learning (ML) model, a security threat diagnosis indicating a likelihood that the electronic security data represents a true security threat to the computing system, wherein the ML model includes a plurality of ML models that are each trained with respective electronic security data as input to generate a plurality of training security threat diagnoses as outputs;

generate, by executing the ML model, a plurality of security threat diagnoses, wherein each security threat diagnosis from the plurality of security threat diagnoses corresponds to a respective ML model of the plurality of ML models; and determine a consensus security threat diagnosis based on the plurality of security threat diagnoses; and display the consensus security threat diagnosis on the user interface for viewing by a user.

10. The system of claim 9, wherein the electronic security data includes at least one security ticket having a plurality of data sections, and wherein the instructions, when executed, further cause the one or more processors to:

condense the plurality of data sections from the security ticket into a condensed data entry; and generate, by executing the ML model, the security threat diagnosis based on the condensed data entry.

11. The system of claim 10, wherein the security threat diagnosis indicates that the electronic security data indicates that:

(i) the true security threat is a benign true security threat;

(ii) the true security threat is a malicious true security threat; or (iii) the security ticket represents a false security threat.

12. The system of claim 9, wherein the plurality of ML models includes three or more ML models, and wherein determining the consensus security threat diagnosis further comprises:

determining a majority security threat diagnosis based on the plurality of security threat diagnoses; and designating the majority security threat diagnosis as the consensus security threat diagnosis.

13. The system of claim 9, wherein the instructions, when executed, further cause the one or more processors to:

receive a user input including one or both of (i) a true positive value, and (ii) a false negative value corresponding to a plurality of security threat diagnoses generated by the ML model; and re-train the ML model based on the user input.

14. The system of claim 9, wherein the ML model is an ensemble ML model, and wherein the plurality of ML models comprising the ML model includes at least one of: (i) a Complement Naïve Bayes model, (ii) a Bernoulli Naïve Bayes model, (iii) a stochastic gradient descent model, (iv) a K-Nearest Neighbors model, (v) a logistic regression model, or (vi) an Adaptive Boost learning model.

15. The system of claim 9, wherein the ML model is a random forest ML model.

16. The system of claim 9, wherein the instructions, when executed, further cause the one or more processors to train the ML model by:

tokenizing data from each training security threat in accordance with an inverse document frequency paradigm; and vectorizing the tokenized data to create a plurality of vector values corresponding to the plurality of training security threat diagnoses with magnitudes dependent on the inverse document frequency paradigm.

17. The system of claim 15, wherein the instructions, when executed, further cause the one or more processors to:

(a) determine a set of hyperparameters corresponding to each ML model of the plurality of ML models;

(b) execute, based on the set of hyperparameters, each ML model of the plurality of ML models using the respective electronic security data;

(c) determine a respective score for each ML model of the plurality of ML models based on the executing;

(d) modify a portion of the set of hyperparameters;

(e) iteratively perform steps (b)-(d) until a cross-validation threshold is satisfied; and (f) determine an optimal set of hyperparameters based on a highest respective score achieved.

18. A non-transitory machine-readable medium comprising instructions for improved security threat analysis that, when executed, cause a machine to at least:

receive electronic security data representing a potential security threat to a computing system;

generate, by processing the electronic security data using an ensemble machine learning (ML) model, a security threat diagnosis corresponding to a likelihood that the electronic security data represents a true security threat to the computing system, wherein the ensemble ML model comprises a plurality of ML models that are each trained with respective training electronic security data to generate a respective plurality of training security threat diagnoses as outputs;

generate a plurality of security threat diagnoses, wherein each security threat diagnosis from the plurality of security threat diagnoses corresponds to a respective ML model of the plurality of ML models; and determine a consensus security threat diagnosis based on the plurality of security threat diagnoses; and display the consensus security threat diagnosis on a user interface for viewing by a user.

19. The computer-implemented method of claim 7, further comprising:

(a) determining, by one or more processors, a set of hyperparameters corresponding to each respective ML model of the plurality of ML models;

(b) executing, by one or more processors based on the set of hyperparameters, each ML model of the plurality of ML models using the respective electronic security data;

(c) determining, by one or more processors, a respective score for each ML model of the plurality of ML models based on the executing;

(d) modifying, by one or more processors, a portion of the set of hyperparameters;

(e) iteratively performing, by one or more processors, steps (b)-(d) until a cross-validation threshold is satisfied; and (f) determining, by the one or more processors, an optimal set of hyperparameters based on a highest respective score achieved.

* * * * *